United States Patent
Scanlon, Jr.

[11] Patent Number: 5,932,133
[45] Date of Patent: Aug. 3, 1999

[54] ION CONDUCTING ELECTROLYTE MATERIAL

[75] Inventor: Lawrence G. Scanlon, Jr., Fairborn, Ohio

[73] Assignee: The United States of America as represented by the Secretary of the Air Force, Washington, D.C.

[21] Appl. No.: 09/087,688

[22] Filed: May 26, 1998

[51] Int. Cl.[6] .............................. H01G 1/74; H01M 6/14
[52] U.S. Cl. .................. 252/62.2; 429/304; 429/307; 429/322
[58] Field of Search .......................... 252/62.2; 429/304, 429/307, 322

[56] References Cited

U.S. PATENT DOCUMENTS

| | | | |
|---|---|---|---|
| 4,251,607 | 2/1981 | Yamaki et al. | 429/194 |
| 4,550,067 | 10/1985 | Horiba et al. | 429/213 |
| 4,996,311 | 2/1991 | Moussavi et al. | 540/139 |
| 5,112,597 | 5/1992 | Moussavi | 424/9 |
| 5,493,017 | 2/1996 | Therien et al. | 540/145 |
| 5,618,929 | 4/1997 | Harrison et al. | 540/139 |

*Primary Examiner*—Sharon Gibson
*Assistant Examiner*—Monique T. Cole
*Attorney, Agent, or Firm*—Charles E. Bricker; Thomas L. Kundert

[57] ABSTRACT

New lithium ion conducting materials comprise phthalocyanine rings. These materials function as sites through which the lithium ion passes. In one aspect of the invention, an electrolyte composition consists essentially of a major amount of a lithium phthalocyanine and a minor amount of a polymer binder. In another aspect, an electrolyte composition consists essentially of aligned and spaced lithium phthalocyanine rings, wherein alignment and spacing of the phthalocyanine rings is achieved through the use of ladder type polymers, comb-like polymers, or crystalline polymers.

5 Claims, 1 Drawing Sheet

ION CONDUCTING ELECTROLYTE MATERIAL

RIGHTS OF THE GOVERNMENT

The invention described herein may be manufactured and used by or for the Government of the United States for all governmental purposes without the payment of any royalty.

BACKGROUND OF THE INVENTION

The present invention is directed to the fabrication of a lithium ion-conducting electrolyte material.

Phthalocyanine was discovered during investigation of a blue material formed as a by-product in the commercial preparation of phthalimide. The substance was found to contain iron held in the center of a heterocyclic macro-ring. Further investigation revealed that other metals could replace iron. The most direct synthesis consists of heating phthalonitrile with a metal. The discovery led to many commercial dyes and pigments.

In recent years, several materials have been proposed for laser addressed applications in which laser beams are used to scan across the surface of the material to leave a written impression thereon. Metal and metal-free phthalocyanines have been used as infra-red absorbing dyes for a number of applications. These phthalocyanines contain from 5 to 16 peripheral organic substituent groups that are linked to the phthalocyanine through sulphur, selenium, tellurium, or nitrogen atoms. Harrison et al, U.S. Pat. No. 5,618,929, issued Apr. 8, 1997, disclose substituted phthalocyanines which absorb infra-red radiation. In another field of use, Moussavi, U.S. Pat. No. 5,112,597, issued May 12, 1992, discloses that lithium phthalocyanine is useful for in vivo oxygen determination by EPR spectrometry.

I have found that lithium phthalocyanines are useful in electrolytes for electrochemical cells.

Ion conducting polymer electrolytes with ionic conductivities on the order of $10^{-3}$ S/cm at ambient temperatures have been prepared by incorporating non-aqueous liquid electrolytes into polymer matrices. For example, in a lithium cell, the anion of the lithium salt is bonded to the polymer matrix thus resulting in single ionic conductivity upon dissociation of the salt in the non-aqueous media. Because of the presence of volatile organic plasticizers (non-aqueous liquid) these electrolytes suffer from poor dimensional and thermal stability. In addition they are very susceptible to degradation through corrosion/passivation reactions with lithium metal electrodes. Thus, it is desirable to improve the operating characteristics of electrolytes and to overcome these and other operational limitations inherent in electrochemical devices. One way of overcoming the limitations of the materials currently used in the electrochemical art is to develop and investigate new materials for their potential application in electrochemical cells.

Accordingly, it is an object of the present invention to provide novel lithium ion-conducting materials which can be used as an electrolyte.

Other objects and advantages of the present invention will be apparent to those skilled in the art.

SUMMARY OF THE INVENTION

We have discovered new lithium ion conducting materials which comprise phthalocyanine rings. These materials function as sites through which the lithium ion passes. In one aspect of the invention, an electrolyte composition consists essentially of a major amount of a lithium phthalocyanine compound and a minor amount of a polymer binder. In another aspect, an electrolyte composition consists essentially of aligned and spaced lithium phthalocyanine rings, wherein alignment and spacing of the phthalocyanine rings is achieved through the use of ladder type polymers, comb-like polymers, or crystalline polymers.

DESCRIPTION OF THE PREFERRED EMBODIMENT

Figure 1:
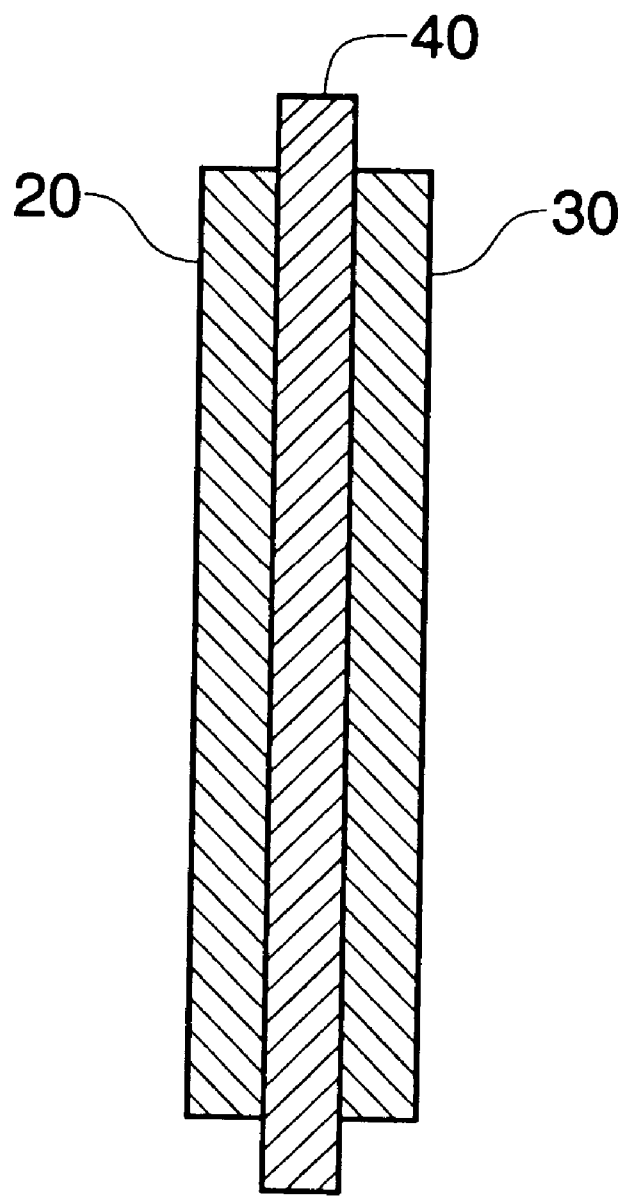
FIG. 1 is a representation of an electrochemical cell including an electrolyte composition in accordance with the invention.

Referring to FIG. 1, there is illustrated a representation of an electrochemical cell including a positive electrode 20, a negative electrode 30 and a polymer electrolyte 40 disposed between the electrodes. Either one or both of the electrodes can be composite electrodes. As used herein and as is generally accepted in the industry, a composite electrode refers to an electrode which includes at least an electrode active material as well as a polymeric material which serves as both binder and to improve conductivity.

The positive electrode 20 may be fabricated including a electrode active material selected from the group of $LiMnO_2$, $V_6O_{13}$, $V_2O_5$, and combinations thereof. The polymeric material used may be either a single polymer or a blend of polymers which provide the desired mechanical strength and high ionic conductivity. The polymer may be selected from the group of, but not limited to, polyesters, polyethers, poly(urethane), poly(ethyloxide), poly(vinylidine fluoride), poly(acrylonitrile), poly(tetrafluoroethylene), and combinations thereof. In a composite electrode, the polymer or polymer blend may comprise up to about 60% of the composite electrode, and typically comprises between five and forty percent of the composite electrode.

The negative electrode 30 or anode of the cell may also be fabricated as a composite electrode. In this case, the composite electrode forming negative electrode 30 includes a polymer or polymer blend as described above with respect to electrode 20. The composite electrode 30 further includes a negative electrode active material selected from the group of materials consisting of carbon, activated carbon, graphite, petroleum coke, lithium alloys, such as LiAl, low voltage lithium intercalation compounds, such as $TiS_2$ and $MOS_2$, and combinations thereof. Once again, the polymer or polymer blend comprises between 5 and 40 percent of the total electrode.

Disposed between the positive and negative electrodes is the polymer electrolyte 40. As noted previously, in one aspect of the invention, the polymer electrolyte composition consists essentially of a major amount of a lithium phthalocyanine and a minor amount of a polymer binder. In another aspect, the polymer electrolyte composition consists essentially of aligned and spaced lithium phthalocyanine rings.

Phthalocyanines are heterocyclic structures having the representative structure shown below:

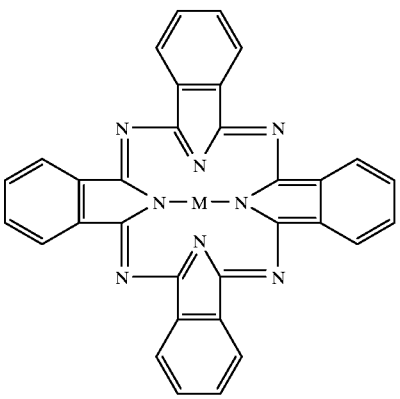

wherein M is a metal, such as Cu. This particular phthalocyanine is made by heating phthalic anhydride with urea and a catalyst.

The lithium phthalocyanines suitable for use in the present invention have the structure:

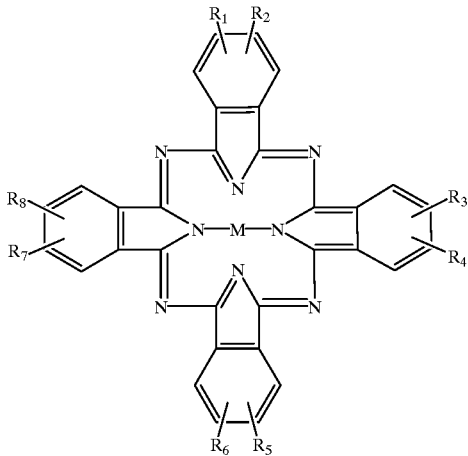

wherein M represents Li or $Li_2$, and the $R_1$ through $R_8$ groups are the same or different, and are independently selected from H, $C_1$ to $C_{20}$ alkyl, $C_2$ to $C_{20}$ alkenyl, $-X^1-COO-X^2$, $-X^1-O-Y$, $-X^1-C_6H_5$ and $-X^1-COZ$ wherein $X^1$ is selected from the group consisting of a chemical bond, $-(CH_2)_n-$ where n is 1 to 20, $-(CH_2)_a-CH=CH-(CH_2)_b-$ wherein a and b each has a value of 0 to 20 and the sum a+b has a value of 1 to 20, $X^2$ is selected from the group consisting of $C_1$ to $C_{20}$ alkyl, $C_2$ to $C_{20}$ alkenyl, Y is selected from the group consisting of $C_1$ to $C_{20}$ alkyl, $C_2$ to $C_{20}$ alkenyl, or H, and Z is selected from the group consisting of $-OH$ and $-NR^1R^2$ wherein $R^1$ and $R^2$ are selected from the group consisting of H, $C_1$ to $C_{20}$ alkyl and $C_2$ to $C_{20}$ alkenyl.

These phthalocyanines can be prepared by reacting a benzenedicarbonitrile of the general formula:

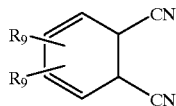

wherein $R_9$ represents any of the $R_1$ to $R_8$ as shown above, with a lithium alkoxide of the formula LiOR, wherein R is a $C_1$ to $C_{20}$ alkyl group, preferably $C_3$ to $C_{15}$. The conversion of the benzenedicarbonitrile to the phthalocyanine is carried out in the alcohol corresponding to the lithium alkoxide employed, i.e., lithium ethoxide in ethyl alcohol, lithium pentoxide in pentanol.

Conversion of the dilithium phthalocyanine to the radical-like lithium phthalocyanine may be accomplished by electrochemical oxidation as disclosed by Moussavi et al, U.S. Pat. No. 4,996,311, issued Feb. 26, 1991, or Moussavi, U.S. Pat. No. 5,112,597, issued May 12, 1992.

Alignment of the phthalocyanine rings can be ensured by linking the phthalocyanine rings with spacing units, such as, for example, ethylene and anthracene. Therien et al, U.S. Pat. No. 5,493,017, issued Feb. 20, 1996, disclose linking porphyrin rings with such spacing units. Substitution of phthalocyanine rings for porphyrin rings in such linking reactions should result in similarly spaced structures. For example, bromination of a phthalocyanine ring, followed by use of a coupling agent such as cis-bis-(tri-n-butyltin) ethylene, provides (1) a comb-like material of the formula:

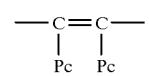

wherein Pc represents a phthalocyanine ring, and/or (2) a ladder-like material having the ethylene coupling on both sides of the Pc units.

In the one aspect of the invention, wherein the electrolyte composition consists essentially of a major amount of a lithium phthalocyanine and a minor amount of a polymer binder, the quantity of such polymer can range from about 1 to about 49 percent, preferably about 5 to 15 percent. The polymer may be selected from the group of, but not limited to, poly(ethylene oxide), poly(vinylidine fluoride), poly (acrylonitrile), poly(tetrafluoroethylene), and combinations thereof. Fabrication of the electrolyte comprises the steps of mixing the phthalocyanine with the polymer and forming an electrode article of desired thickness.

In the second aspect of the invention, wherein the electrolyte composition consists essentially of aligned and spaced lithium phthalocyanine rings, a lithium phthalocyanine containing a reactive functionality is contacted with a second compound which is reactive with the functionality contained within the phthalocyanine. Through careful substituent selection the lithium phthalocyanines can be incorporated into virtually any polymeric matrix known in the art, including but not limited to polyacetylenes, polyacrylates, polyolefins, polyethers, polyurethanes, polycarbonates, polyanilines, polypyrroles, and polythiophenes. The electrolyte is then formed into an electrode article of desired thickness.

For use in a cell, the positive and negative electrodes and the polymer electrolyte of this invention must be assembled into a package. Design and fabrication of suitable packaging arrangements are within the purview of those skilled in the art. Generally, such cells are assembled in a controlled environment and then sealed with some type of case structure.

Various modifications may be made in the present invention without departing from the scope of the appended claims.

I claim:

1. An electrolyte composition consisting essentially of a major amount of a lithium phthalocyanine and a minor amount of a polymer binder.

2. The composition of claim 1 wherein the quantity of polymer binder is about 1 to about 49 percent.

3. The composition of claim 2 wherein the quantity of polymer binder is about 5 to about 15 percent.

4. The composition of claim 1 wherein said polymer binder is selected from the group consisting of poly(ethylene oxide), poly(vinylidine fluoride), poly(acrylonitrile), poly(tetrafluoroethylene), and combinations thereof.

5. An electrolyte composition consisting essentially of aligned and spaced lithium phthalocyanine rings, wherein alignment and spacing of the phthalocyanine rings is achieved through the use of ladder type polymers, comb-like polymers, or crystalline polymers.

* * * * *